United States Patent [19]

Fourrey et al.

[11] Patent Number: 4,982,981
[45] Date of Patent: Jan. 8, 1991

[54] MECHANISM FOR SEAT BELT WITH A MANUALLY ADJUSTABLE POSITION

[75] Inventors: Francois Fourrey, Montbeliard; Serge Deley, Seloncourt; Gerard Escaravage, Valentigney, all of France

[73] Assignee: Ecia-Equipements et Composants Pour L'Industrie Automobile, Audincourt, France

[21] Appl. No.: 431,330

[22] Filed: Nov. 3, 1989

[30] Foreign Application Priority Data

Nov. 4, 1988 [FR] France ............................ 88 14459

[51] Int. Cl.$^5$ ............................................. B60R 22/20
[52] U.S. Cl. ................................. 280/801; 248/222.3; 248/297.3
[58] Field of Search ................. 292/268, 270, DIG. 62; 280/808, 801; 297/483, 468; 248/297.3, 222.3; 403/104, 107, 108

[56] References Cited

U.S. PATENT DOCUMENTS

| | | | |
|---|---|---|---|
| 2,859,710 | 11/1958 | Eisner | 248/222.3 |
| 4,564,219 | 1/1986 | Baden et al. | 280/808 |
| 4,579,368 | 4/1986 | Kawade et al. | 297/483 |
| 4,639,039 | 1/1987 | Donovan | 403/107 |

FOREIGN PATENT DOCUMENTS

| | | |
|---|---|---|
| 0049572 | 4/1982 | European Pat. Off. . |
| 0180306 | 5/1986 | European Pat. Off. . |
| 3005818 | 10/1981 | Fed. Rep. of Germany . |
| 3151019 | 7/1983 | Fed. Rep. of Germany . |
| 2299875 | 9/1976 | France ............... 297/460 |

Primary Examiner—Charles A. Marmor
Assistant Examiner—Karin Tyson
Attorney, Agent, or Firm—Robert E. Burns; Emmanuel J. Lobato

[57] ABSTRACT

The mechanism, which is intended to be associated with a solid structure (10), comprises, among others, a body (30) pierced with a slot (31) one of the sides (312) of which is provided with indents (32) in the shape of a curvilinear triangle (320), a stud (40) which is made of a head (41), of a shank (42) with two successive cylindrical bosses (421, 422) of different diameters of which the largest has a flat (423) and of an end-piece (43) to receive the means of retention (50) and which is intended to be engaged in the slot (31) and to receive a strap support (20), an elastic biasing element (60) exercising a torque on the stud (40), a support (33) close to the slot (31) and a manoeuvring lever (70) fitted with a stop (73) and a bearing (74).

16 Claims, 8 Drawing Sheets

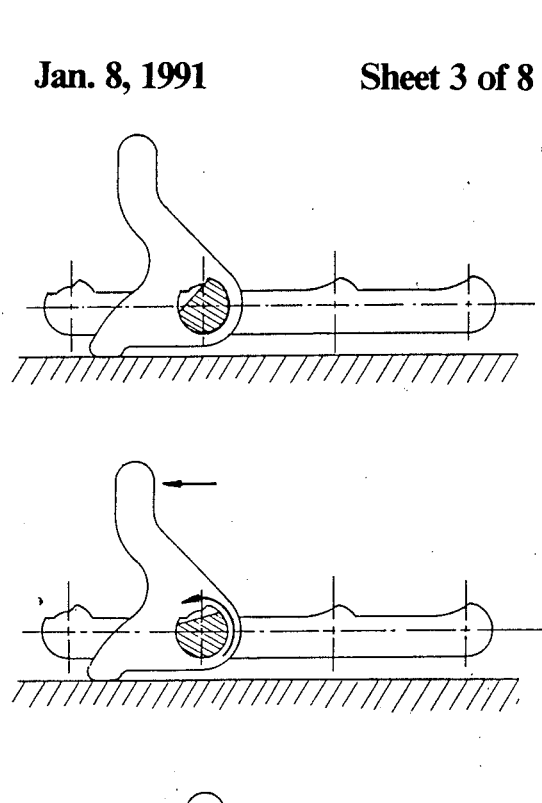

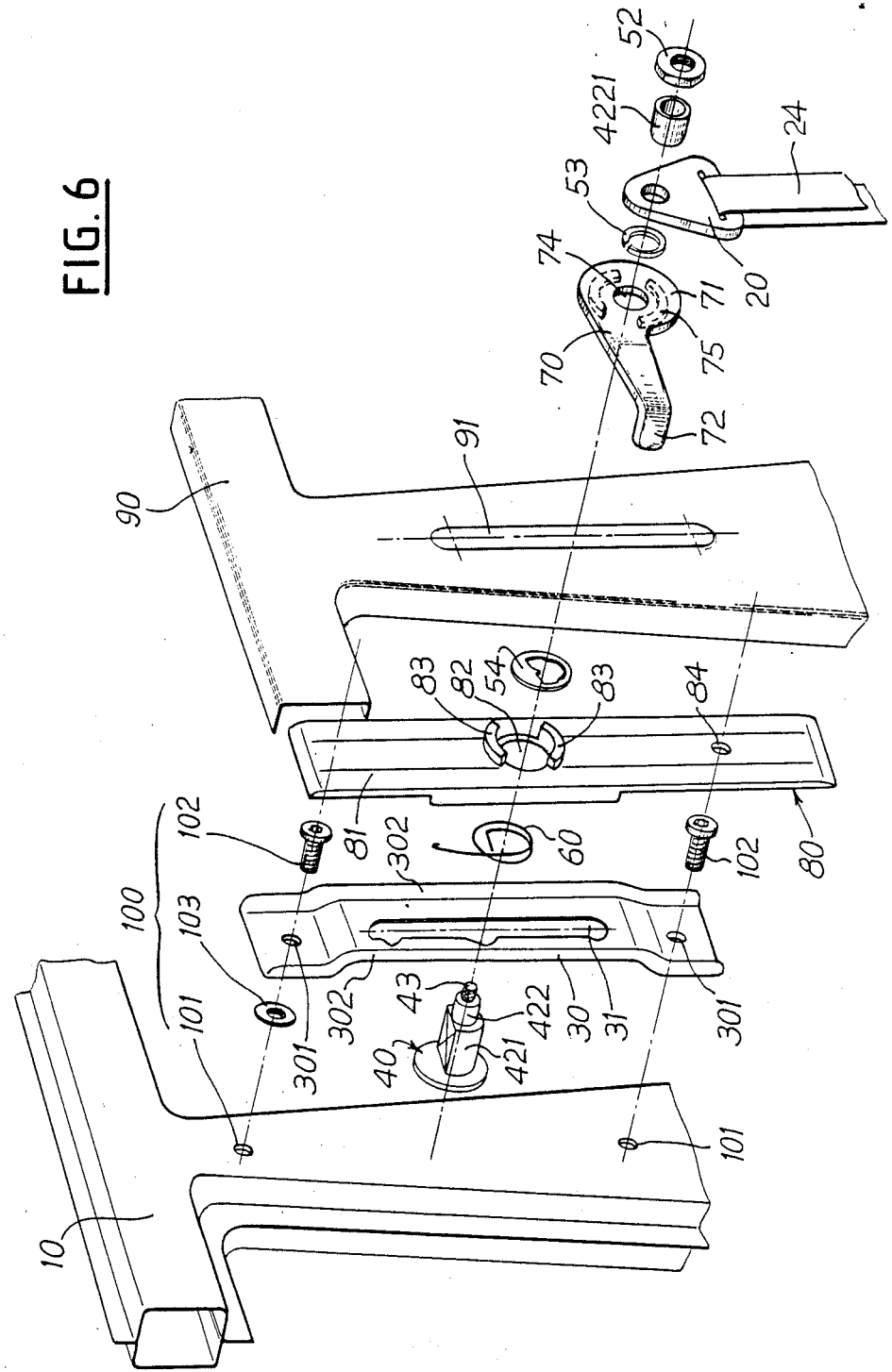

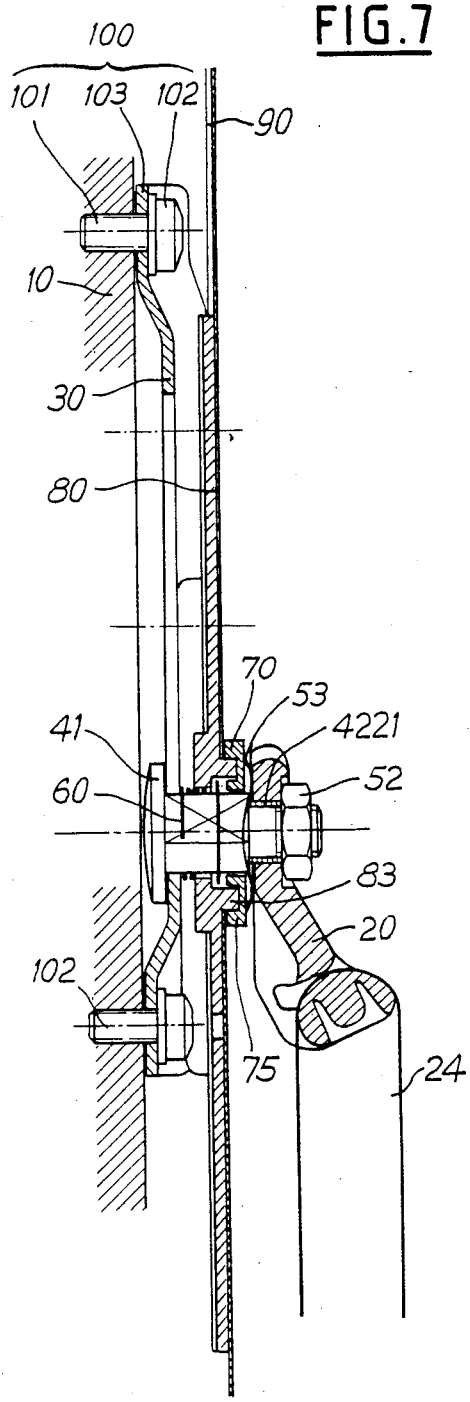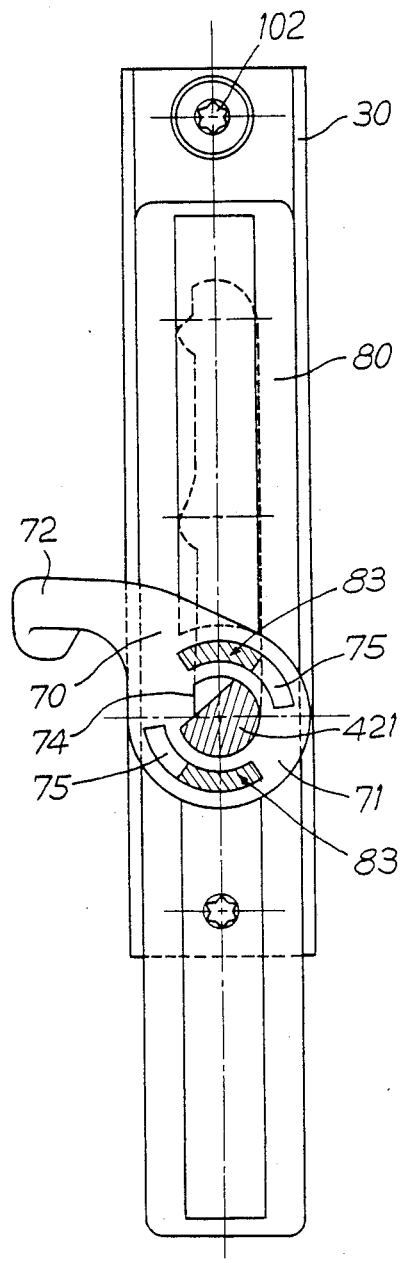

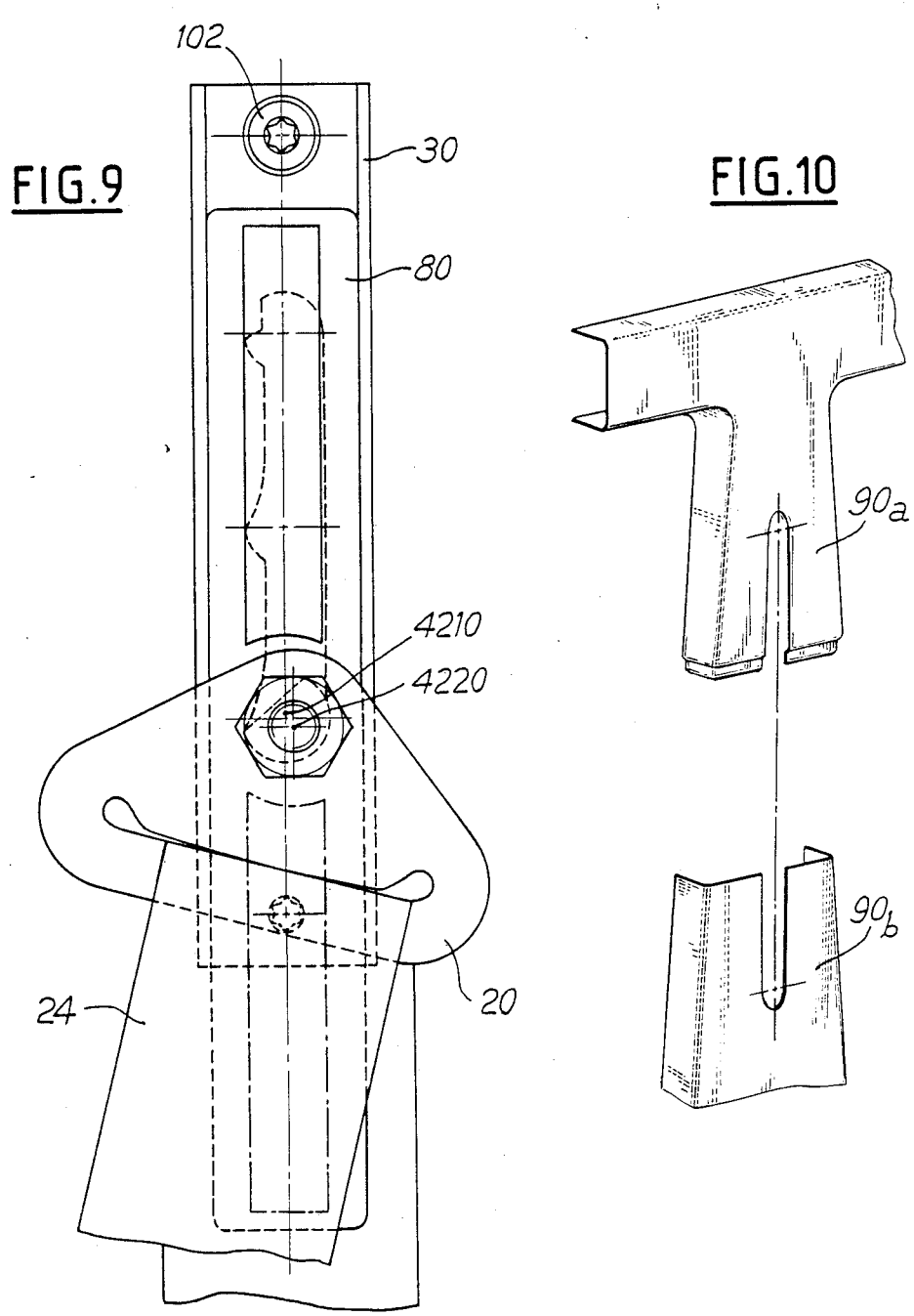

MECHANISM FOR SEAT BELT WITH A MANUALLY ADJUSTABLE POSITION

The present invention relates to seat belts for passenger transport vehicles, notably land-based, and has more particularly as a subject, a holding mechanism for a seat belt with a manually adjustable position of the strap support, which is intended to be associated with a solid structure.

As is known, for reasons of safety, passenger transport vehicles are, generally, provided with seats fitted with seat belts. This is, for example, the case with aircraft and automotive vehicles.

Usually, for land-based automotive vehicles seat belts with two or three anchor points are used. When a seat belt with three anchor points is used, the belt comprises a ventral strap and a pectoral strap which crosses the wearer's torso in the manner of a shoulder strap.

When a seat belt of this latter type is used, the pectoral strap occupies a position relative to its wearer, which is a function, at the same time, of the morphology of the latter, of the geometry of the vehicle and the seat and also the state of wear of the latter. In certain conditions the pectoral strap can be found, in certain cases, at the level of the wearer's neck. It can be understood then that during a violent collision, the seat belt being immobilised under the command of an inertial detector, the passenger's body finds itself violently thrown forward and his neck encounters the strap which can then act no longer as a means of safety but as a particularly dangerous object. In effect, in certain collision cases, severe injuries of the neck have been noted, caused by the seat belt, and more particularly, its pectoral strap.

This is why it has already been proposed to arrange that the upper anchorage of the pectoral strap is in an adjustable position to take into account the morphology of the wearer compared with the configuration of the vehicle.

Various devices have already been proposed. Very often they are such that the upper anchorage point of the pectoral strap can occupy multiple positions situated within an area, the range of which takes account of the morphological extremes of a population compared to its average.

These devices, which sometimes are motorised, are of very great complexity. They very often make use of nut and screw type mechanisms that permit, therefore, the progressive variation of the position of the upper anchorage point of the pectoral strap.

Other embodiments make use of catches and holes relative to which mobile carriage mechanisms move.

Other embodiments make use of bolt mechanisms equipped with a bolt and a keeper.

This last type of solution corresponds, for example, to the embodiment that is the subject of document FR No. 2 261 023. This document describes a holding mechanism for a seat belt with a manually adjustable position of the strap support. This mechanism which is intended to be associated with a solid structure, for example, the bodywork of a vehicle, is comprised, among others, of a body pierced with a slot one of the sides of which is provided with indents, with a stud which is made of a head, a shank with two successive cylindrical bosses of different diameters and with an end-piece to receive the means of retention. This stud is intended to be engaged in the slot in the body and to receive a strap support. This mechanism also comprises an elastic biasing element acting on the stud. In this solution when an axial pressure is exerted on the stud in opposition to the elastic bias, it can be moved from one indent to another in the slot cut in the body and in this way modify the position of the seat belt anchorage point. This device is not entirely satisfactory because it is subject to the failure of the elastic biasing element and is somewhat impractical in handling.

Whatever the solutions that may just have been put forward, they are all of a relatively complicated configuration and due to this fact unreliable, of a relatively high cost and relatively complex to operate.

The invention proposes the realisation of a holding mechanism for a seat belt with a manually adjustable position of the strap support, which is intended to be associated with a solid structure, and does not present this type of inconvenience, which is relatively simple and of a moderate manufacturing and installation price, and also convenient to operate.

A subject of the invention is a holding mechanism for a seat belt with a manually adjustable position of the strap support, which is intended to be associated with a solid structure, and which comprises, among others, a body pierced with a slot, one of the sides of which is provided with indents, a stud which is made up of a head, of a shank with two successive cylindrical bosses of different diameters and of an end-piece to receive the means of retention and that is intended to be engaged in the slot and to receive the strap support, and an elastic biasing element acting on the stud. This holding mechanism is notably characterised in that with the body is associated a support located close to the slot, in that the indents are of a curvilinear triangle configuration, in that the boss with the largest diameter is provided with a flat defined by the connecting edges, in that the elastic biasing element exercises a torque on the stud tending to make it rotate following its axis and in that it comprises a manoeuvring lever fitted with a stop intended to co-operate with the support and with a bearing intended to receive the boss with the greatest diameter.

Other characteristics of the invention will become apparent in reading the description and the claims which follow and in examining the attached diagrams, given only as an example, where:

FIGS. 3A to 3E are diagrams illustrating the working of the mechanism according to the invention following one direction;

FIG. 6 is a similar view to that of FIG. 1 of another embodiment of the invention;

FIG. 7 is a longitudinal cross-section of the embodiment of FIG. 6, similar to that of FIG. 2;

FIG. 8 is a cross-section in the plane perpendicular to the axis of the stud and passing through the bottom of the neck of the lever of the mechanism;

FIG. 9 is a front view of the assembled mechanism; and

FIG. 10 is a particular partial view.

The holding mechanisms for the seat belt with a manually adjustable position of the support strap being well known in the technology, only that which relates directly or indirectly to the invention will be described hereafter. For the rest, the skilled man in the considered technology will draw on current standard solutions at his disposal to satisfy the particular requirements with which he is confronted.

In that which follows the same reference number will always be used to identify the same element whichever the embodiment.

For the clarity of the account each of the components of the mechanism according to the invention will be described successively.

Figure 1:
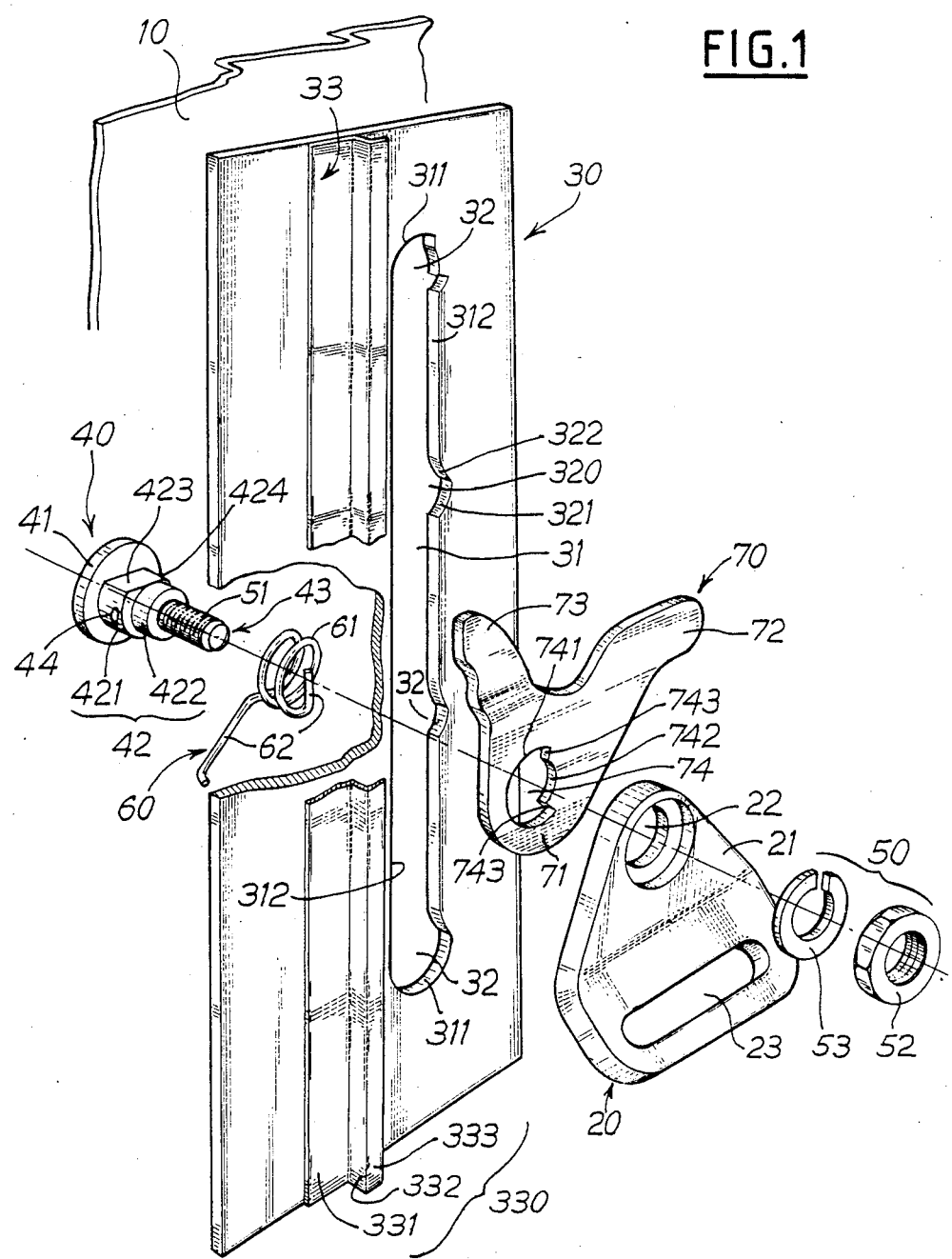
FIG. 1 is an exploded perspective view of an embodiment of a mechanism according to the invention.

As can be seen in particular in FIG. 1 the mechanism according to the invention is intended to be associated with a solid structure such as, for example, the bodywork 10 of a vehicle and, more particularly, for example, to the middle pillar that usually separates the forward and rear side doors of the same side of the vehicle. This bodywork 10 is only represented schematically.

The mechanism according to the invention is intended to carry a strap support 20 of any standard type. This strap support is, for example, a return which allows the change of direction of a strap, not represented, of the seat belt to direct the pectoral strap towards a belt winder, not shown. This strap support 20, only schematised on the diagram, essentially comprises a support 21 in which is bored a hole 22 for example cut as illustrated, and a slot 23 through which the strap runs.

The mechanism according to the invention essentially comprises for this embodiment a body 30, a stud 40 with the means of retention 50, an elastic biasing element 60 and a manoeuvring lever 70.

As can be seen particularly well in referring to FIG. 1, the body 30 is pierced with a slot 31 defined by the opposite extremities 311 and the facing sides 312. On one of the sides 312 are cut indents 32, for example evenly spaced and equidistant. It is clear that these indents can be limited to two, one close to each of the extremities 311 of the slot.

As can be observed, the indents 32 have the configuration of a curvilinear triangle 320 which comprises a concave arc 321 and a convex arc 322 in the direction of the slot 31. In the normal working position of the mechanism, the concave arc 321 is situated below the convex arc 322. In this way steps are formed.

A support 33 is also associated with the body 30, close to the slot 31. For this embodiment this support is presented, for example, in the form of a slide 330 with a sole-plate 331, a side-piece 332 and a flange 333; this slide is orientated parallel to the slot 31, as illustrated.

According to the manner in which the body is made this support in the form of a slide can be formed in one piece or can be added to the body and fixed on the latter by any known technique for example welding, bolting, riveting, gluing, . . .

As can be observed in examining FIG. 1, the stud 40 is composed of a head 41 which is extended by a shank 42 terminated by an end-piece 43.

As can be seen, the shank 42 is made up of two successive cylindrical bosses 421 and 422 of different diameters. On the cylindrical boss 421 with the greatest diameter is provided with a flat 423 which is defined by the connecting edges 424 parallel to the generatrices of the cylinder; in this way projecting corners are formed.

The end-piece 43 is intended to receive the means of retention 50 which ensures the assembly of the parts and the holding of the strap support which can, however, preferably rotate following the axis of the stud to modify its angular position so that the strap can take up its most comfortable orientation.

It should be noted that in FIG. 1, the stud has been turned through a quarter turn relative to its assembled position to facilitate the design. Normally the orientation of the stud 40 is such that its flat 423 is facing the side 312 of the slot 31 where the indents 32 are cut.

Taking account of its shape, the stud can be mounted in the slot, when it is conveniently orientated, at any place in the latter provided with an indent. Consequently it is not necessary to provide a special opening at the upper extremity of the slot.

As illustrated, these means of retention 50 are, for example, a thread 51 cut on the end-piece 43 on which is screwed a nut 52 after having first interposed a washer 53 for example made of elastic of a Grover or "Onduflex" type.

It is clear that these means of retention can also be obtained simply by hammering the end-piece 43 to give it the shape of a rivet head.

For reasons that will be apparent subsequently, the stud 40 is also provided if necessary with a notch 44 or similar.

The elastic biasing element 60 is, for example, a spring 61 made of piano-wire shaped, as drawn, in a way so as to offer two ends 62 which will be returned to subsequently.

As can also be seen notably in FIG. 1, the mechanism according to the invention comprises a manoeuvring lever 70 of which the buckle 71 is provided with a prehensile handle 72, a stop 73 in the form of an arm and a bearing 74. As can be observed, the bearing 74 is presented in the form of two contiguous rings 741 and 742 of different diameters which are defined by the radial shoulders 743.

One of the ends 62 of the spring 61 is intended to be engaged in the notch 44, for example a diametral hole, as illustrated, of the stud to serve as its anchorage point and the other end is intended to rest against the support and, more particularly, against the side-piece 332 of the slide 330.

However, there is reason to note that the presence of the notch 44 is not absolutely indispensable, for in effect, it is sufficient to make use of a flat to give a support to the central strand of the spring.

The correct diameters of the largest cylindrical boss 421 and of the largest ring 741 of the bearing are adjacent and are chosen in such a way that the lever 70 may rotate relative to the stud 40.

In the same way the diameter of the hole 22 of the strap support 20 and the diameter of the smallest cylindrical boss 422 of the shank 42 of the stud 40 are chosen in such a way that the strap support 20 may rotate relative to the stud 40; the washer 53 takes support on the shoulder formed by the boss 422. This washer 53 serves as a brake for the nut 52; this nut - washer assembly can also be advantageously replaced by a brake nut.

In the same way, the width of the slot 31 and the size of the the curvilinear triangles 320 of the indents 32 are chosen in such a way that the cylindrical boss 421 of the largest diameter which is provided with a flat 423 may move in it as will be explained subsequently. In the same way, the size of the head 41 is such that the stud 40 being engaged in the slot 31 and provided with all that it carries, notably with the belt support and the means of retention, the stud may move in the slot without however escaping from this latter.

Figure 2:
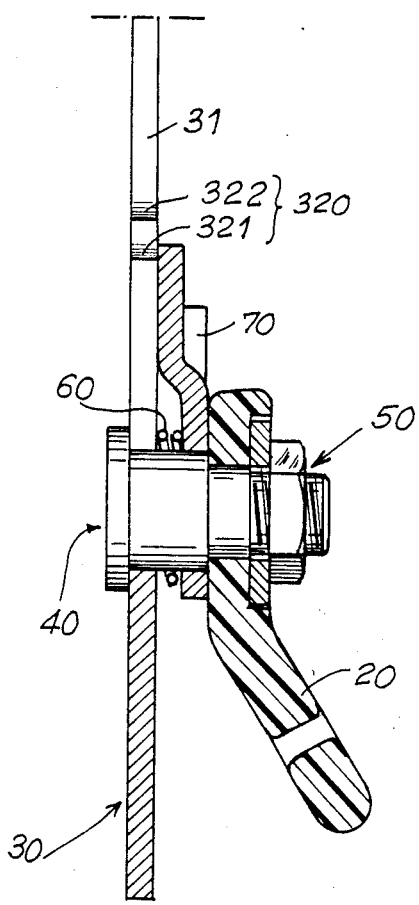
FIG. 2 is a longitudinal cross-section in the plane passing through the axis of the stud and parallel to the direction of the slot.
Figure 4E:
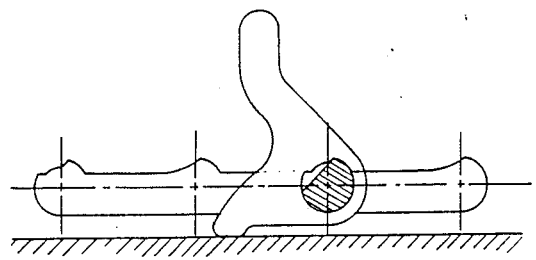
FIGS. 4A to 4E are diagrams illustrating the working of the mechanism according to the invention following the opposite direction.
Figure 4D:
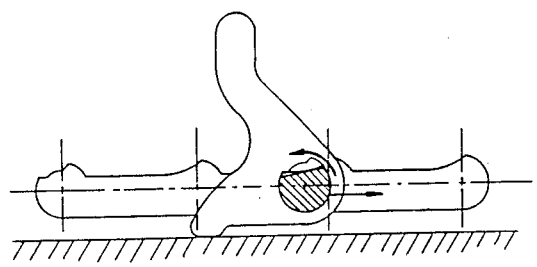
Figure 4C:
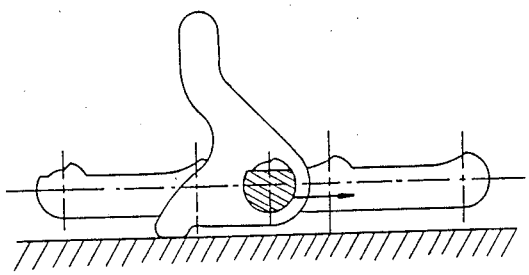
Figure 4B:
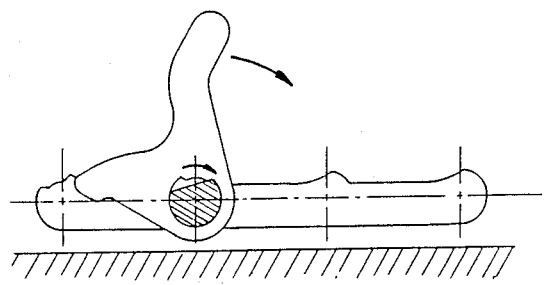
Figure 4A:
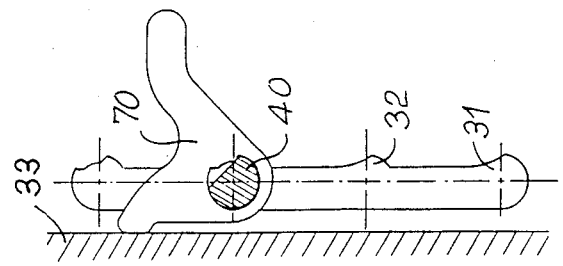
Figure 5D:
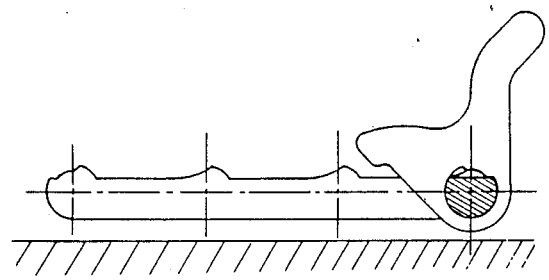
FIGS. 5A to 5D are other diagrams illustrating what happens in the case of failure of the mechanism according to the invention.
Figure 5C:
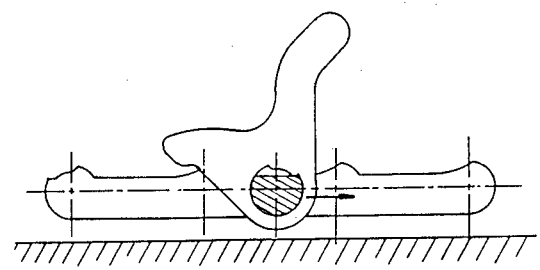
Figure 5B:
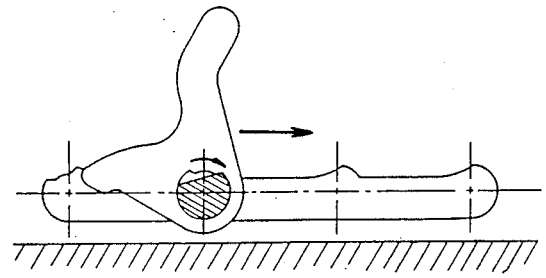
Figure 5A:
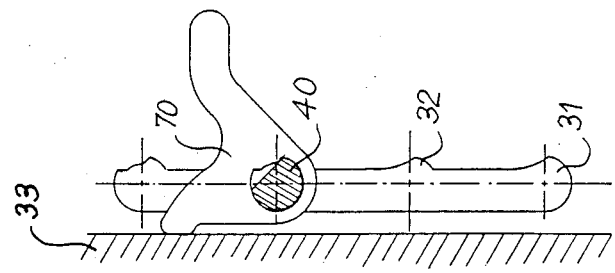

All the constituents of the mechanism just described are assembled and mounted in such a way as to have the configuration which is schematised in FIG. 2.

For example, the mounting of the stud in the slot is effected by passing it behind the body 30. Then after the mounting of the spring, of the lever, of the strap support and of the means of retention, a complete assembly is obtained and the latter is finally attached to the solid structure 10.

The compensation torque exercised by the spring 61 is such that it pulls the stud 40 in an anti-clockwise direction when looking at FIGS. 3A to 5D.

Reference will now be made to FIGS. 3A to 5D to explain the working of the mechanism according to the invention.

Initially, it is supposed that the mechanism according to the invention occupies the position as illustrated in view 3A and that it is going to be raised to the indent situated above the one in which it is engaged. To do this, the prehensile handle 72 is pushed upwards as illustrated by the straight vertical upward arrow in view 3B. By this action the stud 40 is attracted upwards and tends to turn clock-wise, as illustrated by the curved right-rotatory arrow in view 3B, to free it from the indent 32 where it is engaged. This results from the cooperation of the flat 423 and the convex arc 322 of the curvilinear triangle 320. By raising up, the stud rotates and its projecting edge progressively disengages itself from the step; the flat straightens out from the slant where it was located and orientates parallel to the sides 312 of the slot. Everything carried by the stud 40, which plays a role somewhat similar to a cursor, can be moved vertically in the slot 31 up to the desired height, this displacement upwards resulting from the effort applied to the prehensile handle 72 as represented in view 3C. As soon as the prehensile handle 72 is released, the stud 40 having been placed at the level of another indent 32, the stud 40 turns in the opposite direction under the action of the torque developed by the return spring 61 as illustrated by the curved left-rotatory arrow in view 3D.

The stud then finds itself immobilised since it is totally engaged in another of the indents 32 as represented in view 3E.

Reference will now be made to FIGS. 4A to 4E which illustrates the case where the mechanism, being in the position as shown in view 4A, is desired to be moved downwards into an indent situated below it. The prehensile lever 72 is pressed as illustrated by the large curved right-rotatory arrow in view 4B. This causes a rotation of the manoeuvring lever 70 in the same direction so that it carries the stud 40 with it. In effect the lower of the radial shoulders 743 in this view encounters the flat 423 of the shank of the stud. This has the result of dislodging the lower projecting corner from the step where it was engaged. As soon as the flat 423 takes up a position parallel to the straight sides of the slot, all that the stud carries can rapidly slide downwards, for example, under the action of gravity and/or the tension of the strap exercised by the belt winder as illustrated by the straight vertical downward arrow in view 4C or 4D. If the handle is released, the torque exercised by the spring on the stud makes the latter engage itself spontaneously in the first indent in front of which it passes, as illustrated in view 4D and it is immobilised there by the positioning of its projecting corner in the step of the indent. The mechanism has taken up its initial position in the following indent as illustrated in view 4E.

It can be seen, then, that to pass from one position to one that immediately follows below, it is sufficient to give a simple pull on the prehensile handle in a downward direction: the stud disengages itself from the indent, turning in one direction, and the spring acts on the latter, in the opposite direction, in such a way that the lever is brought back in this direction up to the extreme position defined by the contact of the arm of the stop 73 with the side-piece 332 of the slide 330. The flat 423 of the shank then comes to be immobilised against the shoulder 743 of the bearing: the mechanism is then immobilised at the desired height in one of the indents.

If an effort is exercised on the handle 72 in a downward direction and if then it is maintained, the stud and all that it carries rapidly descends towards the lowest end of the slot.

To obtain a step-by-step displacement of the strap support it is sufficient to act on the handle with successive pulls, as is evident from what has gone before.

It can be seen then that the working of the mechanism according to the invention is particularly simple. In effect, a push upwards on the lever permits the raising of the strap support to the desired height while a push downwards on the lever permits the lowering of the strap support.

The handling of the mechanism according to the invention is therefore reduced to one action on the handle of the lever which can be achieved very simply with one hand, indeed one finger.

In addition, it will be noticed that the mechanism according to the invention is particularly reliable.

In effect, in the event of a rupture of the elastic biasing element which constitutes the spring 61, the safety of the passenger is not brought into question. This will be understood by looking at FIGS. 5A to 5D. If the mechanism occupies an intermediary adjustment position, for example, that of view 5A, this position is retained: in effect under the weight or the tension of the strap the projecting corner of the stud remains blocked in the step of the indent. If in such a position the manoeuvring lever is acted upon, upwards or downwards, the stud is carried along in rotation in the direction of the curved right-rotatory arrow either by the convex arc 322 or by the radial shoulder 743 respectively, and the flat takes up a position parallel to the straight sides of the slot and keeps this orientation as shown in view 5C. It can be seen then that the stud and all that it carries descends in the slot to the lowest position of adjustment drawn in view 5D. It can be immediately understood that such a position corresponds to the maximum safety position since a passenger of small size then sees the strap descend to the level of one of his shoulders and not rest on the base of his neck.

The body 30 and the stud 40 of the mechanism according to the invention are, preferably, metallic and made in appropriate fine materials which are formed, for example, by cutting, stamping and folding operations, or turning, cutting off and countersinking operations, as is standard. The stud can also be made by cold strike forging. As for the manoeuvring lever 70 it can be made in the same way or obtained by moulding in an appropriate plastics material.

It is clear that the choice of these materials is only given as an example and that all or part of these elements can be obtained using plastics materials techniques which present the appropriate mechanical properties, in particular of resistance to shearing and/or flexing. For example the rigidity of the body can be improved notably by providing the sides of the slot with lips or flanges folded at right angles and the ends of the slot with forms in semi-circular relief or any other bosses placed at the appropriate places.

This embodiment, even if it is simple and gives satisfaction, can however present, in certain circumstances, operational difficulties. In effect, since its slot is open over the greater part of its length, alien material can be introduced into it and then impede or stop the movement of the stud from regulating the position of the strap. In addition to such an annoyance, it may be that children, whilst playing, could introduce into it keys or other objects which cause disruptions.

This is why another embodiment of the mechanism according to the invention has been constructed. It is illustrated in FIGS. 6 to 9.

This other embodiment is provided with a protector 80 which covers the slot 31 in the body 30 for all the adjustable positions.

As already indicated, the equivalent elements carry the same reference numbers as in the first embodiment. This is why mention will only be made of what differentiates the two illustrated embodiments.

The structure 10 is here the pillar or the "middle column" which is found on the side of a body-shell or body-work of a vehicle.

The fixing device 100 is intended to retain the mechanism according to the invention on the structure; it comprises holes 101, screws 102 and at least one washer 103, ultra-thin, as illustrated. The washer 103 allows the holding of the assembled pieces to facilitate placing and fixing.

The body 30 is formed in the shpe of a U with a middle bridge which links the two lateral branches bent backwards, as drawn. The bridge is pierced with the slot 31 and each of the two branches has a fixing hole 301.

Each of the large sides of the body 30 is bordered with a lateral flange 302 as illustrated. These flanges have a double role: they confer rigidity and perform the function of a guide for reasons exposed subsequently.

The protector 80 is presented in the form of a longitudinal plate 81, along the axis of which a reamed-out hole 82 is cut. This reamed-out hole 82 is provided with a support 83 whose role will be explained subsequently; this support 83 is composed of two wings in the shape of an arc of a circle that partially border the reamed-out hole 82 on part of its circumference and that project over one of the faces of the plate 81; this appears clearly, notably in FIG. 6. The plate is intended to be placed against the bridge of the body and between the flanges 302 in a manner that allows it to slide—the reamed-out hole 82 is intended to receive the stud 40 and, more particularly, its boss 421.

For reasons that will be apparent subsequently, the plate 81 is pierced with a hole 84 in its longitudinal axis.

The cylindrical bosses 421 and 422 of the stud 40 are not coaxial but eccentric; this is clearly apparent in FIG. 9 where the axis 4210 of the boss 421 and the axis 4220 of the boss 422 are drawn. Moreover, as illustrated, the boss 422 is made with a set-in sleeve 4221, slipped over the end-piece 43. If necessary, this sleeve is secured to the nut 52.

The lever 79 carried a stop which is no longer made of an arm but of grooves 75 in the shape of an arc of a circle, cut in one of the faces of the buckle 71; these grooves are intended to receive the wings 83 of the support; this is clearly illustrated in FIGS. 7 and 8, in particular it is sufficient to refer to these.

This mechanism is covered over with a casing 90 all in one piece or in two parts 90a, 90b as illustrated respectively in FIG. 6 or in FIG. 10; this casing is pierced with an aperture 91 to allow the free movement of the stud.

The length of the plate 81 which, whatever the position of the stud, always obscures the slot 31, is such that the mounting of the upper screw 102 is exposed even though the lower screw 102 is not; the hole 84 allows access to this lower screw. A very fine washer 54 of a suitable form serves solely to retain the stud 40, the elastic biasing element 60, the protector 80, and the screw 102 on the body 30 and forms with this latter a pre-mounted entity.

This mechanism is then ready to be assembled and placed on the structure.

The working of this embodiment is as follows; reference will be made in particular to FIG. 8.

For example, the prehensile handle 72 of the lever 70 is pushed upwards. The radial edges of the wings 83 are already in abutment against the radial extremities of the grooves 75 of the lever with the result that the upward effort is transmitted to the stud 40 through the intermediary of the protector 80 which acts on the boss 421. This stud 40 then rotates in an anti-clockwise direction under the effect of the reaction developed by one of the sides of the curvilinear triangle of the indent where it is engaged, then slides upwards. This allows the avoidance of the risk of interference.

As indicated the cylindrical bosses 421 and 422 of the shank 42 of the stud 40 are eccentric. By reference notably to FIG. 9 it can therefore be understood that if the strap 24 is pulled on, a torque is created which tends to engage the edges 424 in the steps of the slot 31; this improves the safety of operation.

The fact of constructing the casing 90 in two parts (FIG. 10) allows the assembly of the complete mechanism according to the invention before its installation on to the vehicle using an assembly line.

According to a variation in execution, not illustrated, the elastic washer 53 is not inserted between the lever and the strap support as illustrated, but between the head of the stud and the bridge of the body. This washer has essentially as its function the avoidance of creating noise linked to the moving parts.

Preferably, the body is made by the cutting and stamping of a metallic plate and the protector by moulding in a plastics material. In the same way the casing can be made in metal or in a plastics material. According to one embodiment the body is one with the structure.

There are therefore claimed, for all that has been exposed, all the advantages of the mechanism according to the invention:

1. A seat belt holding mechanism comprising,
  an elongate body having therein an elongate slot having in one side thereof a plurality of longitudinally spaced indents,
  a stud comprising a head, two successive cylindrical bosses of different diameter and an end portion, the boss of larger diameter being adjacent said head, having a flat side and being slidably received in said slot in said body,
  biasing means acting on said stud with a torque to rotate it relative to said body, a support on said body located close to said slot, a manoeuvring lever rotatable on said boss of larger diameter of said stud through a limited angle and comprising an operating handle and a stop cooperating with said support to limit rotation of said manoeuvring lever relative to said body, a seat belt strap support rotatable on said boss of smaller diameter of said stud and having a slot for receiving said seat belt, and means on said end portion of said stud for retaining said manoeuvring lever and said seat belt strap support on said stud, said stud being movable longitudinally of said slot from one of said indents to another by manual manipulation of said manoeuvring lever.

2. Mechanism according to claim 1, in which said indents are of curvilinear triangular configuration with one convex arcuate side and one concave arcuate side.

3. Mechanism according to claim 2 in which said elongate body is vertical and said concave arcuate side of said indent is below said convex arcuate side.

4. Mechanism according to claim 1, in which said support comprises a longitudinal slide on said body extending parallel to and adjacent to said slot.

5. Mechanism according to claim 4, in which said slide comprises a sole portion affixed to said body, a side portion projecting from said body and a flange on said side portion.

6. Mechanism according to claim 4 in which said biasing means comprises a coil spring wound on said stud and having one end anchored to said stud and another end engaging said slide.

7. Mechanism according to claim 4, in which said stop of said manoeuvring lever comprises an arm on said lever engaging said slide.

8. Mechanism according to claim 1, in which said manoeuvring lever has a bearing hole receiving said stud, said bearing hole comprising two concentric arcs of different radii defining between them radial shoulders engageable with said flat side of said boss of larger diameter of said stud to limit rotation of said manoeuvring lever relative to said stud.

9. Mechanism according to claim 1, in which said end portion of said stud is threaded and said retaining means comprises a nut screwed on said threaded end portion of said stud and means for locking said nut.

10. Mechanism according to claim 1, in which said body is of U-shaped configuration comprising a raised central portion between opposite end portions.

11. Mechanism according to claim 10, in which said body has flanges at opposite side edges thereof.

12. Mechanism according to claim 11, further comprising a protector which covers said slot in said body and is longitudinally slidable between said flanges.

13. Mechanism according to claims 12, in which said protector comprises a plate having an opening to receive said plug.

14. Mechanism according to claim 13, in which said plate has an arcuate slot concentric with said opening and in which said stop of said manoeuvring lever comprises a lug received in said arcuate slot to limit rotation of said lever relative to said body.

15. Mechanism according to claim 1, further comprising a casing covering said body, said casing having an opening through which said stud extends, said manoeuvring lever and seat belt strap support being outside said casing.

16. Mechanism according to claim 15, in which said casing is divided transversely into two parts.

* * * * *